United States Patent Office 3,376,285
Patented Apr. 2, 1968

3,376,285
DISSOLUTION OF CELLULOSE ETHERS
Clayton D. Callihan, Baton Rouge, and Joseph R. Boudreaux, Plaquemine, La., assignors to The Dow Chemical Company, Midland, Mich., a corporation of Delaware
No Drawing. Filed Oct. 12, 1964, Ser. No. 403,337
7 Claims. (Cl. 260—232)

ABSTRACT OF THE DISCLOSURE

Cellulose ethers of improved water dispersibility are obtained by spraying the ether with an oxidizing reagent specific to the oxidation of a vicinal diol on a polysaccharide chain. The cellulose ether is maintained in an agitated condition and sprayed with a solution of the oxidizing reagent. The preferred embodiment involves incorporating into the applicating solution to be sprayed a small amount of a non-ionic, organic wetting agent such as a polyalkylene oxide surfactant.

---

The present invention relates generally to a novel cellulose ether composition having improved solution properties. More particularly, the invention concerns the surface treatment of non-ionic, water-soluble cellulose ethers to improve the water dispersibility and ultimately the dissolution of such materials in water.

The difficulties involved with dissolving water-soluble cellulose ethers in water are well known in the art. Recent patents issued to Menkart et al., U.S. Patent 3,072,635, and Jullander, U.S. Patent 2,879,268, describe surface treatments for particulate cellulose ethers to effect an improvement in their water dispersibility. That is, the treated ethers uniformly disperse in water without forming gelatinous agglomerates, which discontinuities in the dispersion, or fish eyes as they are sometimes called, cause serious problems in the utilization of the ethers.

It would be desirable, and it is an object of the present invention, to provide a novel method for effecting surface treatment of particulate cellulose ethers. Another object is to provide a cellulose ether composition having improved water dispersibility as well as good water solution properties.

Accordingly, the present invention provides a process for treating a water-soluble cellulose ether having a plurality of unreacted vicinal diol groups along its polysaccharide backbone which process comprises uniformly coating said cellulose ether in particulate form with from about 0.05 percent to about 1 percent by weight, based on the weight of the cellulose ether, of an oxidizing agent capable of specifically cleaving a vicinal diol on a polysaccharide. At present, at least three compounds are known to have the necessary capability. They are periodic acid, lead tetraacetate and phenyl iodoso-diacetate. Of these oxidizing agents, periodic acid is preferred. As used herein, the terminology "water soluble" means uniformly dispersible in water to form a visually homogeneous and transparent solution.

As is indicated in the above description, the essential requirement of the ether is the presence along its polysaccharide backbone of at least a minor plurality of unetherified hydroxyls, of which a few are in the form of vicinal hydroxy groups. Generally, it can be ensured that this condition will be met, if the degree of substitution (D.S.) of the ether with etherifying moieties does not exceed about 2.5. This means the average number of etheried hydroxyls on the polysaccharide backbone of the ether will not as a general rule, exceed about 2.5 per anhydroglucose residue moiety.

Illustrative ethers include methyl cellulose, methyl ethyl cellulose, methyl hydroxypropyl cellulose, hydroxyethyl cellulose, hydroxypropyl cellulose, carboxymethyl cellulose, carboxymethyl methyl cellulose, carboxymethyl methyl hydroxyethyl cellulose and the like simple and mixed ethers of cellulose which are soluble, preferably water soluble nonionic ethers, and have a plurality of unetheried hydroxyl groups.

When treated in accordance with the process described above, the water-soluble ether particles are readily dispersed in water, with little or no formation of gels, and once dispersed in water the treated cellulose ethers quickly dissolve.

By contrast, it is often characteristic of water soluble ethers having a surface treatment to enhance their water dispersibility, that once dispersed in water, they are slow to achieve complete solution as evidenced by the attainment of a solution viscosity which remains stable over an extended period of time.

In carrying out the invention, the water soluble particulate cellulose ether is maintained in an agitated condition as by tumbling it in a rolling reactor. As it is thus agitated, the ether is sprayed with a solution of an oxidizing reagent specific to the oxidation of the vicinal diol groups which remain along the partially etherified polysaccharide. The applicating solvent medium is any volatile liquid which is a solvent for, and inert to, the oxidizing reagent. Water is a preferred solvent. When used with lead tetraacetate, however, the water should be made acidic with acetic acid to stabilize the oxidizing reagent.

An optional, but preferred embodiment, involves incorporating into the applicating solution of the specific oxidant a small amount of a nonionic, organic wetting agent. Such materials must of course also be inert to the action of the oxidizing agent and thus may, if they are liquids, serve as the solvent medium for the oxidizing reagent. Preferred wetting agents are the essentially nonionic alkylene oxide polymers. The amount of the oxidizing reagent applied to the particulate ether should be within the range from about 0.05 to about 1 percent based on the weight of the ether. In order to preserve the original solution properties of the ether it is desirable to utilize as little of the oxidant as will promote good dispersion of the treated cellulose ether in water. If a wetting agent is employed, best results are achieved by coating the ether with from about 0.01 up to about 3 percent, based on the weight of the ether of the wetting agent. These include for example, surface active polyethylene and polypropylene oxides and ethylene oxide reaction products with phenol, alkylphenols, glycerine, propylene oxide and the like.

While the surface treatment of the invention is substantially independent of temperature control, the coated ether can be spbjected to elevated temperatures to promote evaporation of the applicating solvent. This drying may be done in the overall temperature range of about 40° C. to about 110° C., but preferably it is done in the range of about 50° C. to about 80° C. After coating a particulate ether with the solution of the oxidizing agent and drying the ether as required to provide a free flowing solid product, the treated product is ready for use.

In a specific illustrative embodiment of the invention, 100 parts by weight of a water soluble methyl cellulose having a degree of substitution of methyl groups of about 1.8 was partially oxidized at vicinal diol groups available at its surface. This was accomplished by spraying the particulate ether with an aqueous solution consisting of one part by weight periodic acid, one part by weight of polypropylene glycol having a molecular weight of about 1200 and 10 parts by weight of water. The amount of the oxidizing agent used was 1 percent by weight based on the ether. The ether was maintained in a state of continuous agitation during the spraying operation by tumbling it in a rolling reactor.

The surface treated ether was then placed in an oven maintained at 50° C. for 24 hours. The resulting dry product was a free flowing solid which readily dispersed in water without the formation of difficultly soluble agglomerates such as are produced when the parent ether is dispersed in water without special precautions to achieve uniform wetting of the ether particles.

In another operation similar to that above, the amount of periodic acid utilized was reduced to 0.1 percent by weight of the ether. Again the treated ether readily dispersed in water to provide a uniform solution. At this concentration there was no yellow tinting of the product such as occurred with higher treatment levels of periodic acid.

Comparable results are achieved by substituting water soluble hydroxypropylmethyl cellulose and hydroxyethylmethyl cellulose, in place of the aforementioned water-soluble methyl cellulose ether or substituting lead tetraacetate or phenyl iodoso diacetate for the periodic acid used above.

The present invention provides a superior surface treated particulate cellulose ether which does not contain odorous residues common to the glyoxal surface treated ethers of the prior art.

What is claimed is:

1. A process which comprises maintaining a particulate, solid water soluble, non-ionic, alkyl cellulose ether, wherein the alkyl group has from 1 to 2 carbons and the ether is characterized by a D.S. less than about 2.5, in a continuously agitated condition and simultaneously spraying the cellulose ether with an aqueous solution of an oxidizing agent specific to the oxidation of a vicinal diol on a polysaccharide chain, the amount of the aqueous solution applied to the ether being sufficient to provide from about 0.05 to about 1 percent, based on the weight of the ether, of the oxidizing agent whereby the surface of the particulate, solid water soluble cellulose ether is oxidized to improve its dispersibility in water.

2. Process as in claim 1 wherein the oxidizing agent is selected from the group consisting of periodic acid, lead tetraacetate and phenyl iodoso diacetate.

3. A process as in claim 1 wherein the aqueous solution contains, in addition to the oxidizing agent, a surface active, alkylene oxide polymer wherein the alkylene oxide has from 2 to 3 carbons.

4. A process which comprises oxidizing the surface of a particulate, water soluble, non-ionic, methyl cellulose ether to improve its dispersibility in water by applying thereto from about 0.05 to about 1 percent, based on the weight of the ether of an oxidizing reagent specific to the oxidation of a vicinal diol on a polysaccharide chain and from about 0.1 to about 3 percent, based on the weight of the ether, of a surface active alkylene oxide polymer wherein the alkylene oxide has from 2 to 3 carbons, said cellulose ether being characterized by a D.S. of less than about 2.5.

5. A process which comprises oxidizing the surface of a particulate water soluble non-ionic, hydroxypropyl methyl cellulose ether to improve its dispersibility in water by applying thereto from about 0.05 to about 1 percent, based on the weight of the ether, of an oxidizing reagent specific to the oxidation of a vicinal diol on a polysaccharide chain and from about 0.1 to about 3 percent, based on the weight of the ether, of a surface active alkylene oxide polymer wherein the alkylene oxide has from 2 to 3 carbons, said cellulose ether being characterized by a D.S. of less than about 2.5.

6. A composition of matter prepared by the process of claim 1.

7. A composition of matter prepared by the process of claim 3.

References Cited

UNITED STATES PATENTS

| | | | |
|---|---|---|---|
| 3,257,380 | 6/1966 | Schweiger | 260—209 |
| 2,854,448 | 9/1958 | Anderson et al. | 260—232 |
| 2,970,063 | 1/1961 | Jordan et al. | 106—208 |

DONALD E. CZAJA, *Primary Examiner.*

L. J. BERCOVITZ, *Examiner.*

R. W. MULCAHY, *Assistant Examiner.*